No. 781,808.

Patented February 7, 1905.

UNITED STATES PATENT OFFICE.

FRANKLIN R. CARPENTER, OF DENVER, COLORADO.

PROCESS OF REDUCING VANADIUM.

SPECIFICATION forming part of Letters Patent No. 781,808, dated February 7, 1905.

Application filed April 27, 1904. Serial No. 205,240.

*To all whom it may concern:*

Be it known that I, FRANKLIN R. CARPENTER, a citizen of the United States, residing at Denver, in the county of Denver and State of Colorado, have invented a certain new and useful Process of Reducing Vanadium, of which the following is a specification.

My invention relates to a process of reducing vanadium, and especially to a process of reduction by which the vanadium is recovered in the form of an alloy.

There exists in many localities ores of vanadium; mainly sandstones, having the general composition vanadium 0.5 to five per cent., silica seventy-four per cent., alumina, &c. Notwithstanding the high temperature required for the reduction of vanadium compounds and the readiness with which it reoxidizes when reduced, I have discovered that the ore specified may be smelted even in an ordinary blast-furnace, provided the fuel and blast are arranged so as to produce a high temperature and a strong reducing action and a carrying metal is present with which the vanadium can alloy.

The utility of vanadium as an addition to steel and other metals has been recognized; but the methods employed for its reduction have been complicated and expensive, and as far as known no attempts have been made to smelt it directly from the ore without previous concentration or other treatment.

In carrying out my process I may use any usual or preferred form of blast-furnace and for fuel coke or charcoal, the fuel and blast being proportioned to each other and to the charge so as to maintain at the zone of reduction the highest possible temperature and reducing action. For the carrying or basic metal I may use any metal with which vanadium will alloy and which is reducible in a blast-furnace, such as iron or copper, the selection being determined by the character of product desired, but will usually be iron added to the charge in the form of iron oxid and in quantities also to be determined by the percentage of vanadium contained in the ore and the percentage to be contained in the product. In order to slag off the large amount of silica present in the ore, a basic flux must be added to the charge, such as limestone or dolomite, preferably the latter. The addition of from one hundred to one hundred and twenty pounds of dolomite to each one hundred pounds of ore will be found to give a suitably refractory slag.

On smelting a furnace charge such as described at the maximum temperature attainable it will be found that, together with the basic metal, a large percentage of the vanadium present in the ore will be reduced and alloyed therewith, and the alloy being drawn off and cast may be subjected to further treatment for purification or separation.

In operating on an ore of the character herein particularly referred to it will be found that in smelting under the conditions specified a certain percentage of the silica will also be reduced, thereby forming, when iron is used as the basic metal, an iron alloy containing a high percentage of silicon and vanadium which may be used as a steel addition in the usual way.

I claim as my invention—

1. The process of extracting vanadium from silicious ores containing it, which consists in subjecting a furnace charge comprising the silicious ore of vanadium, a compound of a carrying metal with which vanadium will alloy, a basic flux and fuel, to an air-blast, the fuel and blast being proportioned to each other and to the other ingredients of the charge to maintain a high temperature and reducing action, thereby causing a reduction of the vanadium and the carrying metal and the alloying of the two, and a union of the basic flux and the silica to form a slag, substantially as described.

2. The process of extracting vanadium from silicious ores containing it, which consists in subjecting a furnace charge comprising the silicious ore of vanadium, iron oxid, a basic flux and fuel to an air-blast, the fuel and blast being proportioned to each other and to the other ingredients of the charge to maintain a high temperature and reducing action, thereby causing a reduction of the vanadium and iron and the alloying of the two, and a union of the basic flux and silica to form a slag, substantially as described.

3. The process of extracting vanadium from silicious ores containing it, which consists in subjecting a furnace charge comprising the silicious ore of vanadium, iron oxid, dolomite and fuel to an air-blast, the fuel and blast being proportioned to each other and to the other ingredients of the charge to maintain a high temperature and reducing action, thereby causing a reduction of the vanadium, and iron and the alloying of the two, and a union of the dolomite and the silica to form a slag, substantially as described.

4. The process of extracting vanadium from ores containing it which consists in subjecting a furnace charge comprising the ore of vanadium, a carrying metal with which vanadium will alloy, a flux and fuel, to the action of an air-blast, fuel and blast being proportioned to each other and to the other ingredients of the charge to maintain a high temperature and reducing action, thereby causing a reduction and alloying of the vanadium with the carrying metal, and a union of the flux with the gangue of the ore to form a slag, substantially as described.

5. The process of extracting vanadium from silicious ores containing it which consists in subjecting a furnace charge comprising the silicious ore of vanadium, iron oxid, dolomite and fuel, in substantially the proportions specified, to an air-blast, thereby reducing and alloying the vanadium and iron and uniting the dolomite and silica into a slag, substantially as described.

In testimony whereof I have hereunto subscribed my name.

FRANKLIN R. CARPENTER.

Witnesses:
MALCOLM HOWE-CARPENTER,
EDWIN VAN CISE.